US009269104B2

(12) United States Patent
Shah

(10) Patent No.: US 9,269,104 B2
(45) Date of Patent: Feb. 23, 2016

(54) AUTOMATIC DETECTION OF MOBILE PAYMENT APPLICATIONS

(75) Inventor: Parth Shah, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 610 days.

(21) Appl. No.: 13/356,480

(22) Filed: Jan. 23, 2012

(65) Prior Publication Data

US 2012/0191569 A1 Jul. 26, 2012

Related U.S. Application Data

(60) Provisional application No. 61/435,200, filed on Jan. 21, 2011.

(51) Int. Cl.
*G06Q 30/00* (2012.01)
*G06Q 30/06* (2012.01)

(52) U.S. Cl.
CPC ........ *G06Q 30/0613* (2013.01); *G06Q 30/0641* (2013.01)

(58) Field of Classification Search
CPC .................................. G06Q 30/0601–30/0645
USPC ................................................ 705/26.1–27.2
See application file for complete search history.

(56) References Cited

U.S. PATENT DOCUMENTS

2008/0126145 A1* 5/2008 Rackley, III et al. ............. 705/7
2010/0299225 A1* 11/2010 Aarni et al. ..................... 705/27

OTHER PUBLICATIONS

Debicka, O., PhD. (2010). Intelligent Customer Service on Tourist Websites. Faculty of Tourism and Hospitality Management in Opatija.Biennial International Congress.Tourism & Hospitality Industry, , 855-866.*

* cited by examiner

*Primary Examiner* — Resha Desai
(74) *Attorney, Agent, or Firm* — Haynes & Boone, LLP

(57) ABSTRACT

In one embodiment, a method for making an payment from a buyer to an online seller includes providing the buyer with a mobile payment application that is operable when run on one or more processors of a mobile device of the buyer to effect payments to the seller using a payment service provider. The seller is provided with computer code that is operable when run on one or more processors of a web server of the seller to detect whether a mobile device of a buyer in communication with the server has the payment application installed thereon, and if the server detects that the buyer's device has the application installed thereon, the seller's server automatically redirects the buyer to a web server of the payment service provider to effect a payment from the buyer to the seller using the mobile payment application.

18 Claims, 2 Drawing Sheets

AUTOMATIC DETECTION OF MOBILE PAYMENT APPLICATIONS

RELATED APPLICATIONS

This application claims the benefit of U.S. Provisional Application No. 61/435,200, filed Jan. 21, 2011 and incorporated herein by reference.

BACKGROUND

1. Technical Field

This invention generally relates to facilitating electronic commerce (e-commerce) over a network and, more particularly, to making payments through mobile devices using a novel mobile payment application ("app").

2. Related Art

The number of persons who shop online or electronically has increased dramatically in recent years. This is due in part to the ease in which consumers can find and pay for an item and complete a purchase transaction therefor in a secure manner and without the necessity of having to go to a seller's physical location to do so. Currently, such online shopping is predominantly effected through a consumer's PC or laptop, and as a consequence, payment providers, such as PayPal, Inc., of San Jose, Calif., and Google, Inc., of Mountain View, Calif., acting in the role of a "payment service provider," have developed payment or checkout "flows" that enable an online consumer to make an online payment for a purchase quickly, easily, and safely.

More recently, an increasing number of consumers are making purchases and payments through his or her mobile device, such as a "smart phone," or a "tablet" device, such as an Apple iPad or the like. This provides greater flexibility than using a personal computer (PC), as the consumer can make a purchase virtually anywhere, as opposed to using a PC, which is typically located at the consumer's place of work or residence. However, in a typical mobile payment situation, the consumer is still obliged to go through a web-based payment flow. This can be cumbersome and time-consuming for a number of reasons. For example, the display of a mobile device is typically much smaller than that of a PC, which results in the consumer having difficulty reading and entering transaction information on the screen. Secondly, mobile device keypads or keyboards are typically much harder to use than a standard PC keyboard, resulting in a higher likelihood of entering erroneous data.

The problems associated with making a payment through a mobile device using a web-based checkout flow can result in a consumer deciding to forego the purchase altogether, or to delay the purchase until the consumer can effect it on a PC, in which case, the consumer might not make the purchase at all. This results in lost sales for the merchant, as well as the consumer missing out on a desired purchase, for example, a purchase available at a sale price that is time-sensitive.

It would therefore be advantageous to have systems and methods by which a consumer can easily and reliably make a payment from a mobile device without having to go through a typical web-based checkout procedure.

SUMMARY

Embodiments of the present disclosure provide systems and methods that detect whether a "mobile payment checkout flow" is available when a consumer is ready to make a purchase or payment through a mobile device. If so, the consumer is directed to the mobile payment flow to effect the purchase. If no mobile payment flow is detected or available on the consumer device, then the consumer can be directed to a conventional "web-based payment flow." Alternatively, the consumer can also be notified that a mobile payment flow, such as a mobile payment "app," is available for downloading and installation for making payments more easily and reliably. If so, the consumer, at his or her option, can then easily and quickly download and use the mobile payment app if desired. As a result, the consumer can then use the easier-to-use mobile payment flow app for making online purchases through the mobile device.

In one embodiment, a method for making an payment from a buyer to an online seller includes providing the buyer with a mobile payment application that is operable when run on one or more processors of a mobile device of the buyer to effect payments to the seller using a payment service provider. The seller is provided with computer code that is operable when run on one or more processors of a web server of the seller to detect whether a mobile device of a buyer in communication with the server has the payment application installed thereon, and if the server detects that the buyer's device has the application installed thereon, the seller's server can automatically redirect the buyer to a web server of the payment service provider to effect a payment from the buyer to the seller using the mobile payment application.

A better understanding of the above and many other features and advantages of the novel mobile payment flow system and methods of the present disclosure and their use can be obtained from a consideration of the detailed description of some example embodiments thereof below, particularly if such consideration is made in conjunction with the appended drawings, wherein like reference numerals are used to identify like elements illustrated in one or more of the figures thereof.

DETAILED DESCRIPTION

Figure 1:
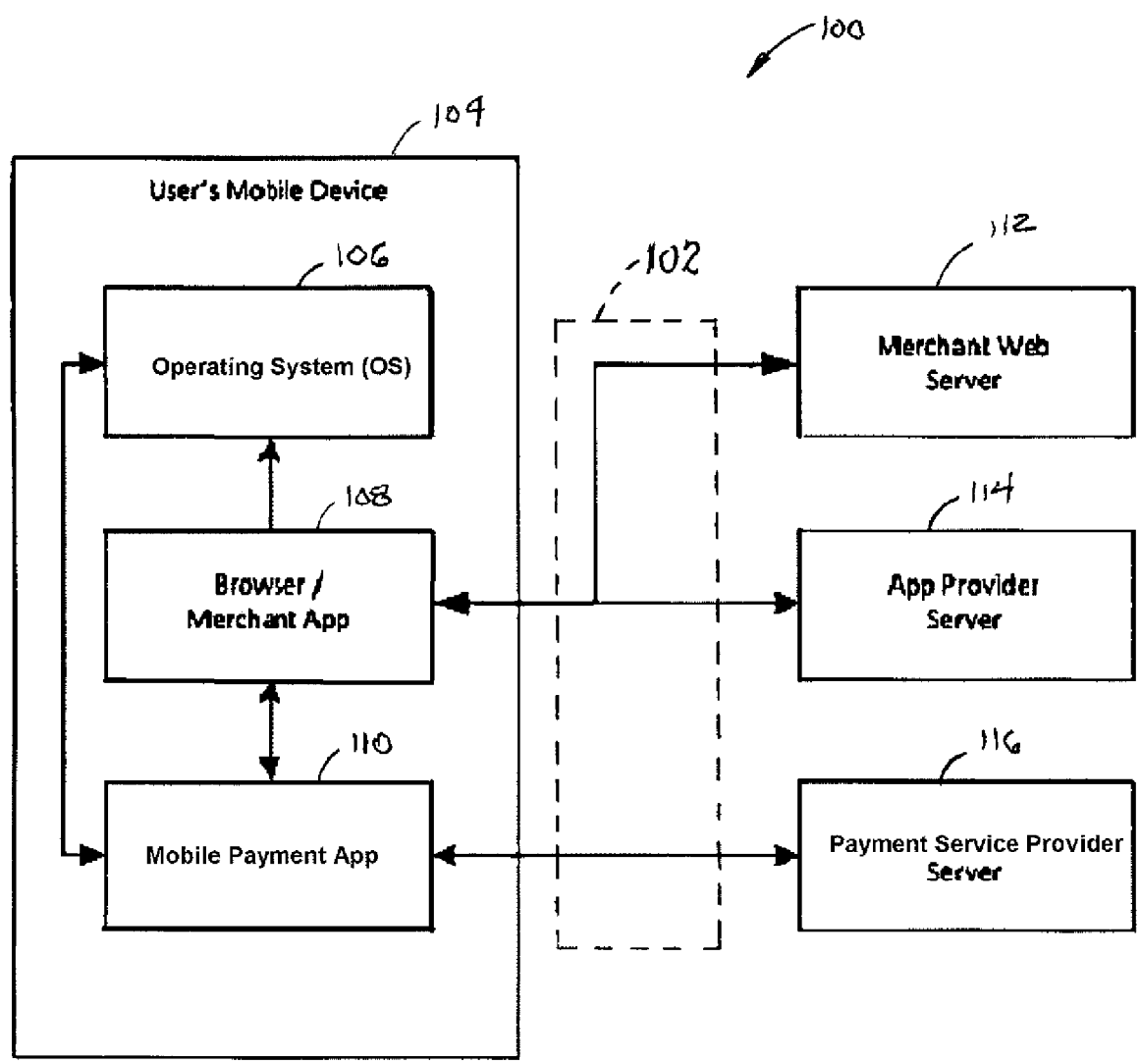
FIG. 1 is a block diagram of a computer system suitable for implementing one or more embodiments of the present disclosure.

A "web" environment within which an example system 100 and methods of the present invention can be advantageously implemented is illustrated in FIG. 1. The system 100 comprises a network 102, which can include a number of wired and wireless segments, including the ubiquitous Internet and various wireless mobile telecommunication networks, such as the Verizon, AT&T, Sprint, T-Mobile, and other mobile telecommunication networks. The system 100 includes a user's mobile device 104, such as a smart phone or tablet, which incorporates one or more processors on which run an operating system (OS) 106 optimized for use on the device 104, such as, for example, the Apple "iOS," Google "Android," RIM "Blackberry," Microsoft "Windows Phone," Samsung "Bada," and other OSes.

In addition to the OS 106, the user's device 104 can store, either in "software" or "firmware" form, a variety of applications, or "apps," operable to effect a wide variety of tasks on behalf and at the behest of the user, including, among others, a "web browser" or "merchant access" app 108, such as a variant of Microsoft Internet Explorer or Google Chrome, and a "mobile payment app" 110, such as the "Isis," "Google Wallet," or "PayPal Mobile" mobile payment apps, which the user can use to effect online, i.e., web-based, payments to another, such as a merchant, via a payment service provider, such as Verizon, Google or PayPal, respectively.

As illustrated in FIG. 1, the example system 100 can additionally include a merchant web server 112 through which the merchant vends goods and/or services online, an app provider server 114, from which either the user or the merchant can obtain "snippets" of code and an online payment app 110 (both typically free of charge), and a payment service provider server 116, such as PayPal, which the user of the mobile device 104 can use to effect payments to the merchant on the user's behalf.

In a typical online purchase scenario, a consumer locates a desired item or service on a web page of an online merchant or vendor using his or her mobile device 104. The "item" that the consumer desires to purchase, (which can include a service, donation to a charitable entity, or anything else for which the consumer desires to make a payment of money to another) can be found using the mobile device's "browser" app 108, or by another means. When the consumer is ready to "checkout," i.e., to effect a desired payment to the merchant or vendor, the consumer typically selects a "payment" button or link provided on the merchant's or seller's web page displayed by the merchant's server 112.

Typically, the consumer is then "redirected" by the merchant's server 112 to a conventional web-based payment checkout "flow" or process, which typically includes a display of a series of "screens" on the user's device 104, which the user is obliged to parse and within which the user is obliged to enter a variety of information, such as the user's name, address, payment account name and number and the like. For example, an initial screen or page might be opened on the mobile device 104 that shows a web page produced by the payment service provider's server 116. The consumer is then obliged to enter all of the information needed to completely effect the transaction in that and each of the subsequent screens or windows displayed on the device. However, because the display of a mobile device 104 is typically much smaller than that of a typical PC, this requires the user to expand or shrink (i.e., zoom in and out) the screen as needed to effect data entry, which can result in the consumer having difficulty reading and entering transaction information on the screen. Additionally, mobile device 104 keypads or keyboards are typically much smaller and harder to use than a standard PC keyboard, resulting in a higher likelihood of entering erroneous data.

In accordance with the present disclosure, however, this problem is overcome in the following manner. When the consumer is ready to make a payment to a chosen vendor or merchant, i.e., to "checkout," the merchant's web server 112 can automatically detect 1) whether the consumer is communicating with it via a mobile device 104, and 2) if so, whether there is a mobile payment process, i.e., a mobile payment app 110, installed on the consumer's mobile device 104 that the consumer can use to effect payment to that merchant. For example, if the merchant's server 112 detects that the consumer has a "mobile payment" app 110 from a payment provider, such as PayPal, installed on the mobile device 104, the merchant's server 112 can then automatically redirect the consumer to that app 110, instead of displaying a web page for a conventional web-based payment checkout process of the type described above. Once opened, the consumer is presented with a much easier interface and process within which to effect the payment. In particular, since the payment app 110 was specifically designed for use on a mobile device, the sequential series of screens shown on the mobile device 104 are both easier to read and navigate in without having to zoom in and out within the screens, and fewer in number, since the user's information is typically already filled in automatically with the user's identification and account information. Such an app 110 can consist of, for example, the PayPal Mobile payment app, which is suitable for both "App-to-App" and "Web-to-App" payment flows.

The foregoing system and method can be effected in a number of ways. In one example embodiment, an Apple iPhone OS's Software Development Kit (SDK) enables an application to bind itself to a custom Uniform Resource Locator (URL) scheme, and for that scheme to be used, to launch itself automatically from either a browser or from another application on the iPhone when invoked appropriately. This custom URL can be registered with the iPhone. Such an implementation can be suitable for iPad tablet devices as well. For Google Android device users, implementation can be similar to that for the iPhone SDK, with the Android OS providing a URL scheme to launch applications from a browser or from within another application in a manner similar to that of the Apple OS. Other OSes also typically provide similar software development tools.

Using the mobile payment app, the consumer can then more easily enter any requested information to effect an online payment. Examples include a user identifier (such as a user name, email address, phone number) and a password or PIN if the consumer has not yet been authenticated by the payment service provider selected. The consumer can also be asked to confirm the payment, such as by selecting or tapping a button or link. As a result, the consumer is then able to make the payment through a mobile payment checkout flow much more easily and reliably than using a conventional web-based payment transaction flow. After the payment is made, the consumer can be directed back to the merchant app or web site to, for example, continue shopping.

If, on the other hand, no mobile payment app 110 is detected by the merchant server 112, (for example, if none has been installed on the user's device 104), in some embodiments, the consumer can be redirected to a web page that is opened by the mobile browser 108 for a conventional web-based checkout payment process, as described above. But in one advantageous embodiment, the consumer can be queried as to whether he or she wants to download and install a mobile payment app 110 to his or her mobile device 104. If the consumer elects to do so, the merchant's server 112 can provide the consumer with, for example, a link to one or more apps that he or she can access to download the mobile payment app 110 onto his or her mobile device 104. The link can be an address on the merchant's server 112, or alternatively, on a payment service provider's server 116. By so doing, the next time the consumer wishes to make a payment through a merchant using the mobile device 104, the consumer will automatically be presented with the above "streamlined" mobile payment checkout process provided by the app 110 for a much easier and quicker checkout process.

Figure 2:
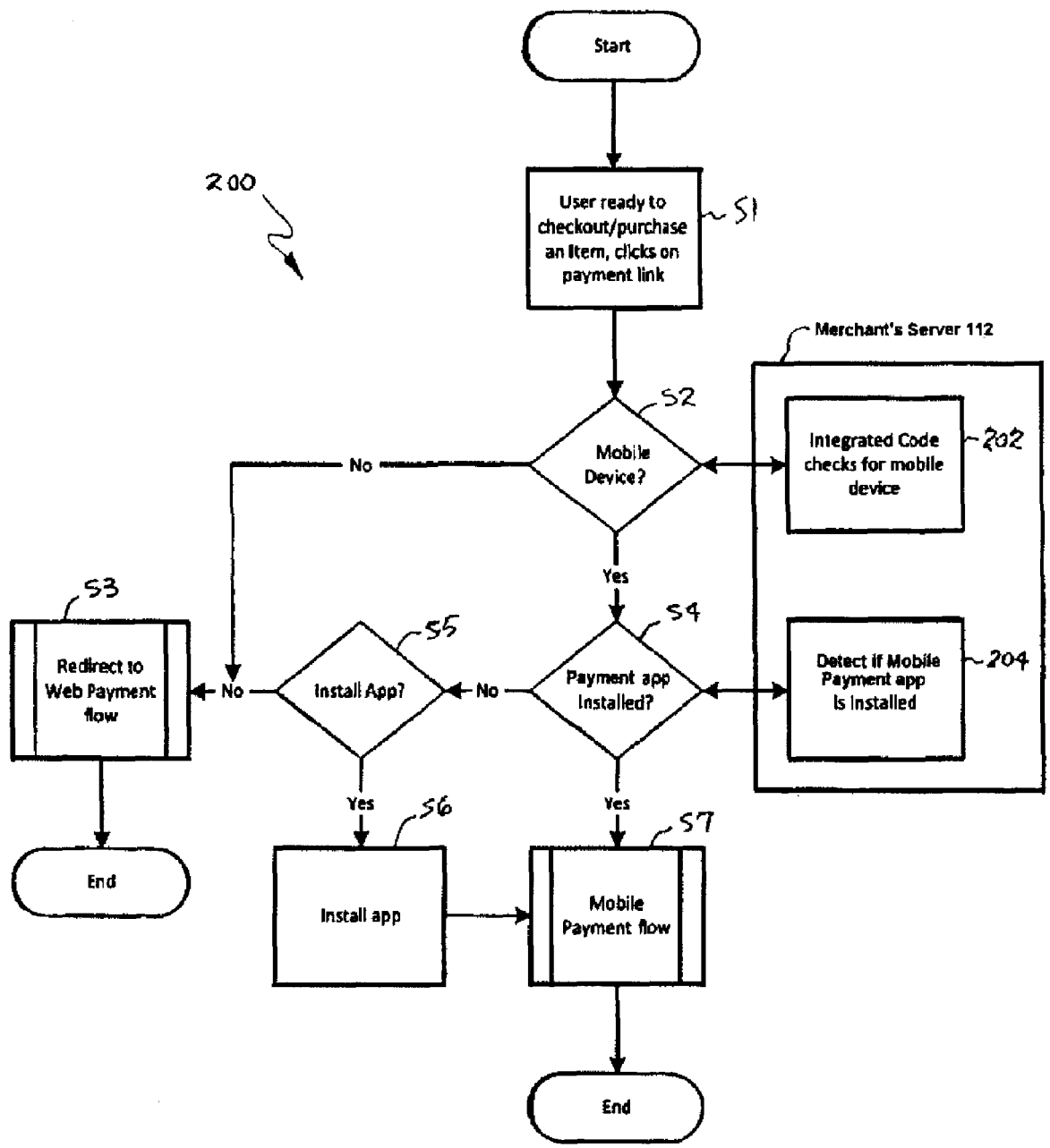
FIG. 2 is a flow diagram of an example embodiment of a method for making an online payment in accordance with the present invention.

As illustrated in FIG. 2, there are a number of ways in which the system 100 of the present disclosure can be implemented. In one example method 200, a merchant or seller can be provided by the payment service providers with the appropriate snippets of code 202, 204, which are respectively operable on the merchant's server 112 to 1) detect whether a consumer is communicating with the merchant via a mobile device 104, and if so, 2) to detect if a suitable mobile payment app 110 is installed on the consumer's device 110. The code 204 enables an app running on the merchant's server 112 ("merchant app") to integrate and work with the payment service provider mobile payment app 110.

For example, as illustrated in FIG. 2, once the consumer is ready to make a purchase from the merchant at S1, such as by selecting a button or link on the merchant's web page, the merchant's server 112, at S2, first conducts a search using the code 202 to determine whether the consumer is communicating via a mobile device 104. If not, the merchant's server 112 can then redirect the consumer at S3 to a conventional web payment checkout process as described above to effect the payment. However, if at S2, the merchant's server 112 detects that the consumer is communicating via a mobile device 104, then at S4, the merchant's server 112, using the detection code 204 provided by the payment service provider, can then determine whether a suitable mobile payment app 110 is installed on the consumer's device 104. This latter step can be accomplished in a number of different ways, depending on the particular OS 106 installed on the consumer's device 104.

For example, for App-to-App ("App2App") flows on an iPhone or iPad device 104, the iPhone SDK provides methods for detecting whether the user has a particular mobile payment app 110 installed on the device 104. For example, one method uses the code snippet "canOpenURL" to check if the application can open the registered URL discussed above (for example, to launch the PayPal Mobile Payment App 110 from the merchant's webpage or from within another iPhone app). If not, at S4, the merchant can provide the user with the option of being redirected to the "iTunes: PayPal Application page," where, at S5, the user can elect, at S6, to download and install the PayPal mobile payment app 110, and then proceed, at S7, to pay for his or her purchase through the streamlined payment checkout flow process described above. Alternatively, if the user elects not to download and install the mobile payment app, the merchant's server 112 can then redirect the user to the conventional web-based payment checkout process at S3, as above.

The code "snippet" 204 used to detect the payment app 110 on the user's device 104 can be included in the app running on the merchant's server 112. Alternatively, or in addition, it can be provided on a PayPal integration website for re-use by app developers. This is analogous to the provision of an existing PayPal "BuyNow" button, the form code for which is available on the PayPal integration website for the free use by merchants and other online payment recipients.

For Web-to-App ("Web2App") flows on an iPhone 104, when a customer clicks on or selects the "Pay" button on a merchant's website, the payment provider (e.g., PayPal) can provide two options for the customer. One is "Launch PayPal," and the other is "Get PayPal," which redirects the user to the "iTunes: PayPal Application page" described above. And, although the foregoing examples are presented in the context of iPhone and iPad devices and the Apple iOS and SDK, it should be understood that alternative embodiments of payment flow methods 200 that are useful on user mobile devices 104 that use other OSes, e.g., the Android OS and others, can easily be confected by using an approach similar to the one described above, and accordingly, that the present invention is not limited to Apple mobile devices or OSes.

Indeed, in light of the foregoing description, it should be clear that many modifications, substitutions and variations can be made in and to the materials, apparatus, configurations and methods of use of the mobile online payment systems of the present disclosure, and in light thereof, that the scope of the present disclosure should not be limited to that of the particular embodiments illustrated and described herein, which are merely by way of some examples thereof, but rather, should be fully commensurate with that of the claims appended hereafter and their functional equivalents.

What is claimed is:

1. A method for exchanging data over a network comprising a plurality of wired segments, the method comprising:
configuring a web server comprising at least one web server processor to:
detect whether a device is a mobile device that communicates with the web server based on the at least one web server processor running a first snippet of code received from a service provider system, wherein the web server is configured to detect the mobile device based on a custom Uniform Resource Locator (URL) of the mobile device;
redirect the device to a web-based checkout flow process to complete a checkout if the device is not the mobile device communicating with the web server; and,
if the device is the mobile device communicating with the web server, detect whether the mobile device has a checkout application installed based at least on the web server processor running a second snippet of code received from the service provider system, wherein the checkout application is associated with the custom URL.

2. The method of claim 1, further comprising, if the mobile device has the checkout application installed thereon, using the at least one web server processor to redirect the mobile device to a checkout process with the checkout application to complete the checkout.

3. The method of claim 2, wherein the mobile device is redirected to the web server of the service provider system.

4. The method of claim 3, further comprising using a processor of the service provider system for redirecting the mobile device back to a web page of a seller after the checkout is complete.

5. The method of claim 1, further comprising, if the mobile device does not have the checkout application installed thereon, using the at least one web server processor to provide a seller with a link to a network address that a buyer can optionally elect to access and install the checkout application on the mobile device.

6. The method of claim 5, further comprising using the at least one web server processor for redirecting the buyer to the web-based checkout process to complete the checkout if the buyer does not elect to access and install the checkout application on the mobile device.

7. The method of claim 5, further comprising, if the buyer elects to access and install the checkout application on the mobile device, using the at least one web server processor for redirecting the buyer to a checkout process with the checkout application to complete the checkout.

8. The method of claim 5, wherein the network address is that of the service provider system.

9. A non-transitory machine-readable medium comprising a plurality of machine-readable instructions which, when executed by one or more processors of a server, are adapted to cause the server to perform a method comprising:
configuring the server to:
detect whether a device is a mobile device that communicates with the server based on the one or more processors running a first snippet of code received from a service provider system, wherein the server is configured to detect the mobile device based on a custom Uniform Resource Locator (URL) of the mobile device;
redirect the device to a web-based checkout process to complete an online checkout if the device is not the mobile device communicating with the server; and
if the device is a mobile device communicating with the server, detect whether the mobile device has a checkout application installed based on the server processor running a second snippet of code received from the service provider system, wherein the checkout application is associated with the custom URL locator.

10. The machine-readable medium of claim 9, wherein the method further comprises, if the mobile device has the checkout application installed thereon, redirecting the mobile device to a checkout process with the checkout application to complete the checkout.

11. The machine-readable medium of claim 9, wherein the method further comprises, if the mobile device does not have the checkout application installed thereon, providing a seller with a link to a network address that a buyer can optionally elect to access and install the checkout application on the mobile device.

12. The machine-readable medium of claim 11, wherein the method further comprises, if the buyer does not elect to access and install the checkout application on the mobile device, redirecting the buyer to the web-based payment checkout process to complete the checkout.

13. The machine-readable medium of claim 11, wherein the method further comprises, if the buyer elects to access and install the checkout application on the mobile device, redirecting the buyer to a checkout process with the checkout application to complete the checkout.

14. A system configured to exchange data over a network comprising a plurality of wired segments, the system comprising:
 a hardware memory of a web server storing information associated with a mobile checkout application and a corresponding service provider system; and
 a web server processor coupled to the hardware memory and operable to:
  configure the web server to detect whether a device is a mobile device that communicates with the web server based on the at least one web server processor running a first snippet of code received from the service provider system, wherein the web server is configured to detect the mobile device based on a custom Uniform Resource Locator (URL) of the mobile device;
  redirect the device to a web-based checkout flow process to complete a checkout if the device is not the mobile device communicating with the web server; and
  if the device is the mobile device communicating with the web server, detect whether a checkout application is available on the mobile device based on the web server processor running a second snippet of code received from the service provider system, wherein the checkout application is associated with the custom URL locator.

15. The system of claim 14, wherein the web server processor is further operable, if the mobile device has the mobile checkout application available thereon, to redirect the mobile device to a checkout process with the mobile checkout application to complete the checkout.

16. The system of claim 14, wherein the web server processor is further operable, if the mobile device does not have the checkout application available thereon, to provide a seller with a link to a network address that a buyer can optionally elect to access and install the checkout application on the mobile device.

17. The system of claim 16, wherein the web server processor is further operable, if the buyer does not elect to access and install the checkout application on the mobile device, to redirect the mobile device to the web-based checkout process to complete the checkout.

18. The system of claim 16, wherein the method further comprises, if the buyer elects to access and install the checkout application on the mobile device, redirecting the buyer to a checkout process with the checkout application to complete the checkout.

* * * * *